W. WARLICK.
Plows.

No. 152,886. Patented July 7, 1874.

Witnesses:
G. B. Towles
A. P. Lacey

Inventor:
Williamson Warlick
By W. Burris Atty.

UNITED STATES PATENT OFFICE.

WILLIAMSON WARLICK, OF ELLIJAY, ASSIGNOR OF ONE-HALF TO JEROME SPILMAN, OF MARIETTA, GEORGIA.

IMPROVEMENT IN PLOWS.

Specification forming part of Letters Patent No. 152,886, dated July 7, 1874; application filed April 25, 1874.

*To all whom it may concern:*

Be it known that I, WILLIAMSON WARLICK, of Ellijay, in the county of Gilmer and State of Georgia, have invented certain new and useful Improvements in Hill-Side and Subsoil Plows; and I do hereby declare that the following is a full, clear, and exact description thereof, which will enable others skilled in the art to which it pertains to make and use the same, reference being had to the accompanying drawings and to the letters of reference marked thereon, which form a part of this specification.

Figure 1:
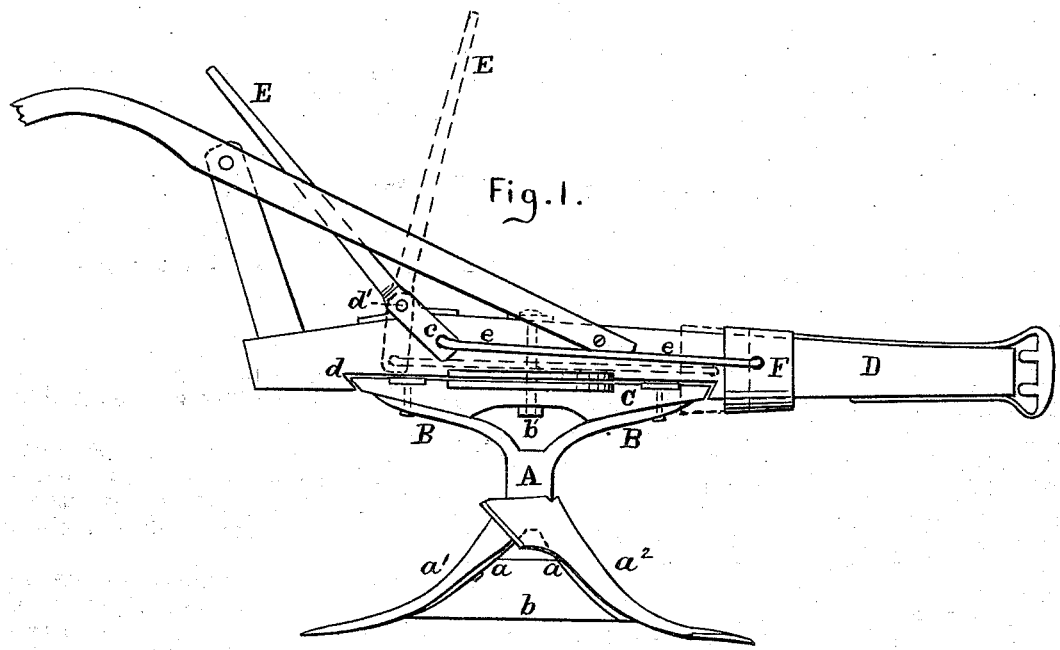
Figure 2:
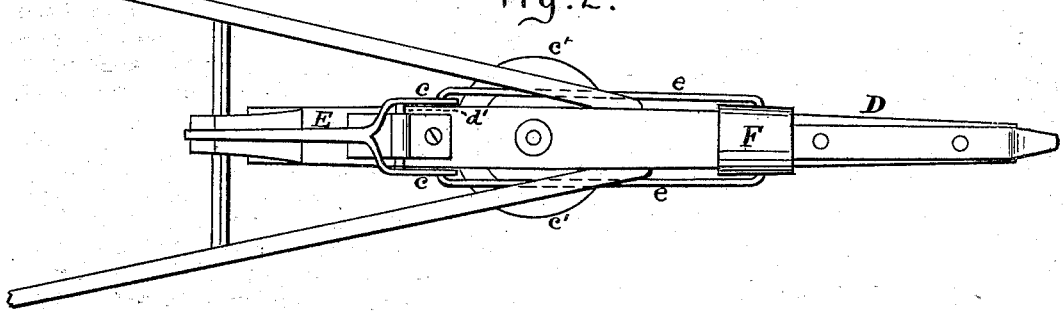

Figure 1 is a side elevation. Fig. 2 is a plan view.

My invention relates to a reversible and convertible hill-side and subsoil plow, constructed as hereinafter described.

A represents the plow-standard, provided with two arms, B B, and two reverse shoes, $a\ a$, to which are attached two plow-molds, $a^1$ $a^2$, and a land-side, $b$. C is a sub-beam, bolted to the arms B B, and pivoted in the middle to the main beam D by the bolt $b'$. The ends of the beam C are beveled to fit the beveled shoulders $d$ in beam D, as shown in Fig. 1 of the drawings. E is a lever arranged to operate on a fulcrum-bolt, $d'$, on beam D, and is provided with two arms, $c\ c$, connecting with the back ends of rods $e\ e$, the forward ends of which rods are fastened to the collar F, as shown in the drawings. Circular friction-plates $c'\ c'$ are arranged between the beams C and D. The sub-beam is held in place laterally by the collar F, which is operated by the lever and connecting-rods. The collar is drawn over the forward end of the beam C by moving the lever to the position shown by dotted lines in Fig. 1. When the main beam is to be reversed the collar is slipped forward beyond the end of the sub-beam by drawing the lever back, as seen in Fig. 1, and the beam is readily reversed and the plow adjusted for running back in the same furrow or on the same land, throwing the furrow or subsoil in the same direction.

The shoes are provided with the proper holes for bolting onto them any kind of plowshares and molds, so that the plow may be readily converted into a subsoil-plow, hill-side plow, or common plow.

Subsoil-plows with the subsoil-molds arranged to run behind the main plows are of too heavy draft for one horse, or even for two ordinary horses. To obviate this difficulty, and to furnish a subsoil-plow of a sufficiently light draft for one horse, I combine a subsoil-mold, $a^1$, with a common plow-mold, $a^2$, on the same standard, attached to a reversible beam, as described, so that when a furrow of usual depth is made by the common plow the subsoil-mold may be run back by the same horse in the same furrow, stirring and throwing up the subsoil.

When the plow is used for ordinary hill-side plowing, a common mold, $a^2$, is attached to each shoe; and when it is used as a common plow only, one mold only is attached.

I am aware that reversible hill-side plows are not new, and I do not claim them; but

What I claim as new, and desire to secure by Letters Patent, is—

In a reversible plow, the standard A, having reverse shoes $a\ a$, constructed as described, and adapted to carry a surface-plow and a subsoil-plow, and provided with arms B, attached to a sub-beam, C, substantially as and for the purposes set forth.

In testimony that I claim the foregoing as my own invention I affix my signature in presence of two witnesses.

WILLIAMSON WARLICK.

Witnesses:
JNO. H. THURMAN,
W. H. SULLIVAN.